United States Patent
Wilson et al.

(10) Patent No.: US 10,039,307 B2
(45) Date of Patent: Aug. 7, 2018

(54) METHOD AND APPARATUS FOR CONTROLLING COFFEE BEAN ROASTING

(71) Applicant: Board of Regents, the University of Texas System, Austin, TX (US)

(72) Inventors: Preston S. Wilson, Austin, TX (US); Mark S. Wochner, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 14/932,325

(22) Filed: Nov. 4, 2015

(65) Prior Publication Data

US 2016/0120211 A1    May 5, 2016

Related U.S. Application Data

(60) Provisional application No. 62/074,784, filed on Nov. 4, 2014.

(51) Int. Cl.
*A23N 12/08* (2006.01)
*A23F 5/04* (2006.01)
*A23N 12/12* (2006.01)

(52) U.S. Cl.
CPC .......... *A23N 12/08* (2013.01); *A23F 5/04* (2013.01); *A23N 12/125* (2013.01)

(58) Field of Classification Search
CPC .......... A23N 12/125; A23N 12/08; A23F 5/04
See application file for complete search history.

(56) References Cited

U.S. PATENT DOCUMENTS

| | | | |
|---|---|---|---|
| 4,494,314 A | 1/1985 | Gell, Jr. | |
| 4,602,147 A | 7/1986 | Gell | |
| 5,359,788 A | 11/1994 | Gell, Jr. | |
| 5,500,237 A | 3/1996 | Gell, Jr. et al. | |
| 5,960,561 A | 10/1999 | Parodi et al. | |
| 6,260,479 B1 | 7/2001 | Friedrich et al. | |
| 2003/0095673 A1 | 5/2003 | Colmenarez et al. | |
| 2008/0089986 A1* | 4/2008 | Song ............... | A23N 12/125 426/466 |

(Continued)

FOREIGN PATENT DOCUMENTS

| | | | | |
|---|---|---|---|---|
| CA | 2267608 A1 * | 9/2000 | .............. | A23F 5/04 |
| WO | WO200221944 A1 | 3/2002 | | |
| WO | WO2013006718 A1 | 1/2013 | | |

OTHER PUBLICATIONS

P. Wilson, "Coffee roasting acoustics", J. Acoust. Soc. Am., Jun. 2014, vol. 125, iss. 6, Acoustical Society of America.

(Continued)

*Primary Examiner* — Steven Leff
(74) *Attorney, Agent, or Firm* — Intrinsic Law Corp.

(57) ABSTRACT

A system and method for roasting coffee beans, or similar products, is disclosed. In an aspect the invention includes an acoustic sensor, such as a microphone, which senses the acoustic emissions or "cracks" made by the coffee beans during the roasting process. The acoustic emissions are translated in the system and method to signals that are processed, including in some aspects using frequency domain processing, so as to control the roasting process and achieve a desired final product. The acoustic emissions can also be used to determine if the coffee beans are caffeinated or decaffeinated.

21 Claims, 13 Drawing Sheets

(56) References Cited

U.S. PATENT DOCUMENTS

| | | | |
|---|---|---|---|
| 2010/0051602 A1* | 3/2010 | Beardsley | A23L 5/17 |
| | | | 219/429 |
| 2013/0344207 A1 | 12/2013 | Ludwig | |
| 2014/0076167 A1* | 3/2014 | Boggavarapu | A47J 31/42 |
| | | | 99/286 |
| 2014/0242239 A1* | 8/2014 | Boggavarapu | A23F 5/26 |
| | | | 426/433 |
| 2014/0255569 A1* | 9/2014 | Jacobsen | A23L 1/1812 |
| | | | 426/242 |
| 2016/0295906 A1* | 10/2016 | Jacobsen | A23N 12/10 |

OTHER PUBLICATIONS

U.S. ISA, "International Search Report—PCT App. No. PCT/US2015/058986", dated Jan. 28, 2016, WIPO.

European Patent Office, "Extended European Search Report—Application No. 15856833.7", May 15, 2018, EPO.

\* cited by examiner

METHOD AND APPARATUS FOR CONTROLLING COFFEE BEAN ROASTING

RELATED APPLICATIONS

This application is related to and claims priority to U.S. Provisional Application No. 62/074,784, entitled "Controlling and Ensuring the Consistency of the Coffee Roasting Process Utilizing Roasting Acoustical Characteristics of Acoustic Amplitude, Spectral Content and Crack Rate," filed on Nov. 4, 2014, which is incorporated herein by reference.

TECHNICAL FIELD

The present invention relates generally to coffee roasting, and more particularly to real-time process and system control of coffee roasting by monitoring one or more acoustical characteristics of a coffee roasting device.

BACKGROUND

Coffee is the world's most widely traded tropical agricultural commodity, with about $30 billion dollars spent worldwide on the product and about one billion dollars spent annually on the energy required to roast the beans. Green coffee beans must be roasted before they are used in all forms of the coffee beverage. Roasting the beans is accomplished using a variety of heating methods and at a variety of scales, ranging from mass-market industrial roasters running continuously to the single batch home roaster processing a couple of batches a week. To place the economic impact of global coffee roasting in perspective, the cost of energy required to roast the world's yearly supply is about $1 \times 10^9$ (calculated using the average 2011 consumer cost of electricity in the US, $0.1/kW-h), hence both economic and quality optimization is of interest.

Controlling the roast time and temperature profile results in a range of roast levels from light to dark, greatly affecting the style, flavor, and aroma of the resulting coffee beverage. Terminating the roasting process at just the right time allows the roaster (most often, a human operator) to achieve the desired darkness of the roast and its accompanying flavor profile, and hence is one of the key roast parameters. Several metrics can be monitored (time, color, aroma, bean volume, bean temperature), using process measurement instrumentation or by the person conducting the roast, to indicate the degree of roasting and ultimately to determine when to terminate the roast.

The roasting process can also be monitored by ear, by listening for events known collectively as the "first crack" and "second crack," which also signify the progression of the roast. During the roasting process, the human operator may listen for two temperature thresholds called "cracks." At about 200-220° C. (392-428° F.), beans will emit a cracking sound much like popcorn does when it pops, only much quieter. This point is called the "first crack," marking the beginning of light roasts. When the beans are at about 224-245° C. (435-473° F.), they emit a "second crack." During the first and second "cracks," pressure inside the bean has increased to the point where the structure of the bean fractures, rapidly releasing gases, thus an audible sound is emitted. By listening for such cracks, the operator may terminate the roasting process to achieve the desired darkness of the roast and its accompanying flavor profile.

Typically though, roasters, especially large commercial roasters, will often generate enough noise internally that the operator can no longer hear the first or second cracks, which are strong indicators of the roasting process. Hence, the operator may under or over roast the beans due to the inability of hearing these cracks thereby leading to an inconsistent product. Furthermore, over roasting the beans results in wasted energy.

Hence, the current roasting process of coffee beans involves an inconsistent roasting of the beans as well as wasted energy when the beans are over roasted.

SUMMARY

The present invention is directed to a system and method for roasting coffee beans, or similar products. In an aspect the invention includes an acoustic sensor, such as a microphone, which senses the acoustic emissions or "cracks" made by the coffee beans during the roasting process. The acoustic emissions are translated in the system and method to signals that are processed, including in some aspects using frequency domain processing, so as to control the roasting process and achieve a desired final product.

Aspects of the invention are directed to a method for controlling coffee roasting, the method comprising heating coffee beans in a coffee roasting chamber of a coffee roaster; using a microphone, detecting a measured acoustic energy emitted from the coffee roasting chamber; in a real-time microprocessor-based controller, receiving as an input a first signal representing the measured acoustic energy; in the controller, determining if the measured acoustic energy is within a tolerance of a reference acoustical profile, the reference acoustical profile including reference acoustical characteristics of a reference coffee roasting process; in the controller generating a control signal if the measured acoustic energy is outside the tolerance of the reference acoustical profile; and transmitting the control signal from the controller to the coffee roaster, the control signal to adjust a temperature of the coffee roasting chamber. The controller can be part of the coffee roasting apparatus or a separate device, such as a smartphone or tablet.

Other aspects are directed to a system for controlling the roasting process for roasting coffee beans in a coffee roaster, including a chamber for holding coffee beans to be roasted; a heat source in thermal communication with said chamber for heating said coffee beans to be roasted; an acoustic sensor in acoustic communication with said coffee beans so that said acoustic sensor can sense acoustic emissions from said coffee beans during their roasting; a programmable processor receiving an output of said acoustic sensor; said processor programmed and configured to determine at least amplitude information and frequency information from the output of said acoustic sensor; said processor further programmed and configured to compare said amplitude and said frequency information with pre-stored data so as to determine a bean roasting condition; said processor further programmed and adapted to control said roasting process based at least on said bean roasting condition; and a user interface coupled to a roasting controller providing an output of said user interface indicative of said roasting condition.

In some aspects, the present system and method enable an automated computer-driven (programmed machine) process for controlling a coffee bean roast to achieve a desired result. The roasting process can be tailored to suit a given product (bean) and application (end product) and may further follow a roasting profile that can be manually or automatically generated. In some aspects, the roasting process, rate of heating and other roasting conditions can be controlled by an automated computer-driven controller which can compare an actual roasting condition of the beans in real time to a pre-stored or user-selected roasting profile. The roasting process then can be controlled to match or follow the desired roasting profile. In another aspect, the roasting process can be controlled according to any of an acoustic amplitude of the cracks of the beans being roasted and/or spectral (frequency) content from acoustic signals collected by an acoustic sensor (e.g., a microphone). A controller to control the roasting process can be integrated into the coffee roaster or it can be a separate device, such as a smartphone or tablet. A microphone for such applications can be a high-temperature microphone such as a piezo electric transducer adapted to withstand temperatures of at least 200 degrees Fahrenheit, or even temperatures in excess of 500 degrees Fahrenheit. The microphone can have an acoustic response in a range including at least a portion of the audible range, and in an example spanning 100 Hz to 10 kHz. In another example the microphone frequency response can span the range of 100 Hz to 20 kHz. In yet another example, the microphone can respond to acoustic inputs above 20 kHz (ultrasonic frequencies). In some embodiments, a visual display can display acoustic information including spectral content and acoustic amplitude in real time. Such visual display can assist an operator in manual control of a coffee roaster or the visual display can function as a check in automatic control of the coffee roaster.

In some aspects, the invention is directed to a method for determining a physical property of coffee beans. The method includes heating the coffee beans in a coffee roasting chamber of a coffee roaster. The method also includes using a microphone, detecting a measured acoustic energy emitted from the coffee roasting chamber. The method also includes in a real-time microprocessor-based controller, receiving as an input a first signal representing the measured acoustic energy. The method also includes in the controller, determining if the measured acoustic energy is within a first tolerance of a reference decaffeinated coffee bean roasting acoustical profile, the reference decaffeinated roasting acoustical profile including reference decaffeinated acoustical characteristics of reference decaffeinated coffee beans in a first reference roasting process. The method also includes in the controller, determining if the measured acoustic energy is within a second tolerance of a reference caffeinated coffee bean roasting acoustical profile, the reference caffeinated roasting acoustical profile including reference caffeinated acoustical characteristics of reference caffeinated coffee beans in a second reference roasting process. The method also includes in the controller, generating a first output signal that indicates that the coffee beans are decaffeinated if the measured acoustic energy is within the first tolerance of the reference decaffeinated coffee bean roasting acoustical profile. The method also includes in the controller, generating a second output signal that indicates that the coffee beans are caffeinated if the measured acoustic energy is within the second tolerance of the reference caffeinated coffee bean roasting acoustical profile. The method also includes presenting a graphical image on a display corresponding to the first output signal or the second output signal, the graphical image indicating the coffee beans are decaffeinated or caffeinated, respectively.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

IN THE DRAWINGS

For a fuller understanding of the nature and advantages of the present invention, reference is made to the following detailed description of preferred embodiments and in connection with the accompanying drawings, in which.

DETAILED DESCRIPTION

As stated in the Background section, the roasting process can be monitored by ear, by listening for events known collectively as the "first crack" and "second crack," which also signify the progression of the roast. During the roasting process, the human operator may listen for two temperature thresholds called "cracks." At about 200-220° C. (392-428° F.), beans will emit a cracking sound much like popcorn does when it pops, only much quieter. This point is called the "first crack," marking the earliest termination of light roasts. When the beans are at about 224-245° C. (435-473° F.), they emit a "second crack." During the first and second "cracks," pressure inside the bean has increased to the point where the structure of the bean fractures, rapidly releasing gases, thus an audible sound is emitted. By listening for such cracks, the operator may terminate the roasting process to achieve the desired darkness of the roast and its accompanying flavor profile. Typically though, roasters, especially large commercial roasters, will often generate enough noise internally that the operator can no longer hear the first or second cracks, which are strong indicators of the roasting process. Hence, the operator may under or over roast the beans due to the inability of hearing these cracks thereby leading to an inconsistent product. Furthermore, over roasting the beans results in wasted energy. Hence, the current roasting process of coffee beans involves an inconsistent roasting of the beans as well as wasted energy when the beans are over roasted.

The principles of the present invention provide a means for improving the detection of the first and second cracks by using roasting acoustical characteristics of acoustic amplitude, frequency content and rate of cracks thereby ensuring consistency in roasting the coffee beans and lowering energy costs by preventing the over-roasting of the beans as discussed below in connection with FIGS. 1-11.

Figure 1:
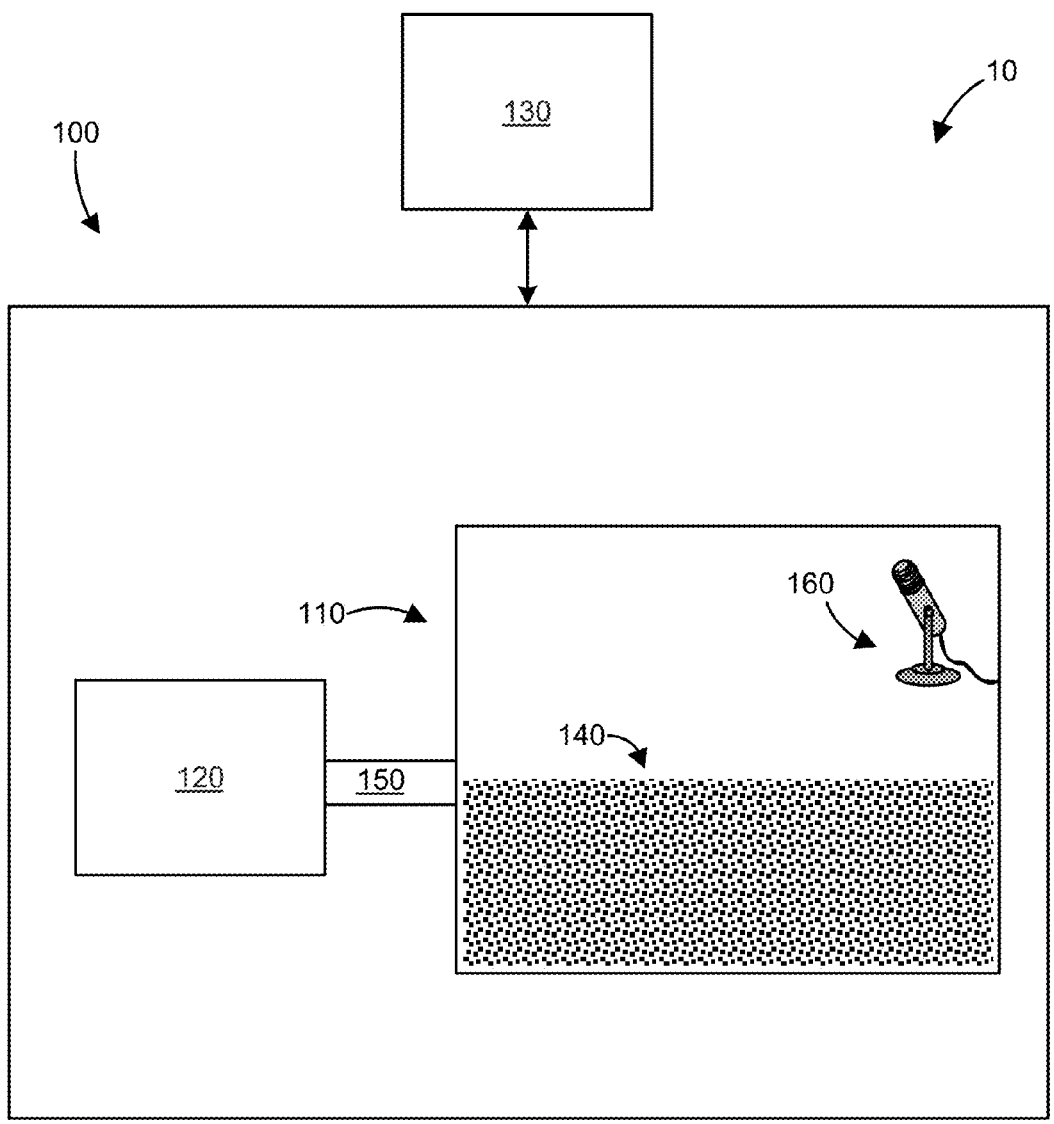
FIG. 1 illustrates a block diagram of a coffee bean roaster in accordance with an embodiment of the present invention.

FIG. 1 illustrates a block diagram of a coffee bean roaster 100 in accordance with an embodiment of the present invention. Coffee bean roaster 100 is generally described in U.S. Patent Application Publication No. 2013/0344207 whose description is incorporated herein by reference in its entirety. A brief description of system 10 for roasting coffee beans is provided below.

The system 10 includes a coffee bean roaster 100 having a roasting chamber 110, a heater 120, and a controller 130. The chamber 110 is configured to hold coffee beans 140. The chamber 110 can include a blade or similar device to stir the coffee beans 140. During roasting, the heater 120 delivers heat to the roasting chamber 110 through a conduit 150. In some embodiments, the heater 120 is disposed in the chamber 110 and a conduit 150 is not needed.

The microprocessor-based controller 130 is in communication with the roaster 100 to monitor and control process parameters, such as the temperature of the chamber 110 (e.g., via a control signal to the heater 120) and the roasting time. The controller 130 is also in communication with a microphone 160 disposed in or near the chamber 110 to detect sounds and acoustic energy (e.g., cracking) generated during roasting. Such sounds can be measured and analyzed to control the roasting process, as discussed below. While a single microphone 160 is illustrated in FIG. 1, multiple microphones 160 can be used to detect the sounds emitted during the coffee roasting process. In some embodiments, the microphone 160 can be disposed outside the roaster 100, for example, the microphone 160 can be in a computer, smartphone, or other device.

In some embodiments, the controller 130 is a computer preferably with a touch screen display for user input and system monitoring, the programming in the computer operating the system in accordance with inputs selected by an operator.

While the following discusses the present invention in connection with utilizing a coffee bean roaster 100 of FIG. 1, the principles of the disclosure may utilize any coffee bean roaster (e.g., coffee roasting system in which gas recirculation is used; a horizontal, rotating drum with a perforated wall is used as the roasting chamber; a horizontal rotating drum with a wall without perforations is used as the roasting chamber; a roaster in which single-pass gas flow is used) where the sounds emitted during the coffee roasting process can be measured and analyzed. A person of ordinary skill in the art would be capable of applying the principles of the present invention to such implementations. Further, embodiments applying the principles of the present invention to such implementations would fall within the scope of the present invention.

Figure 2:
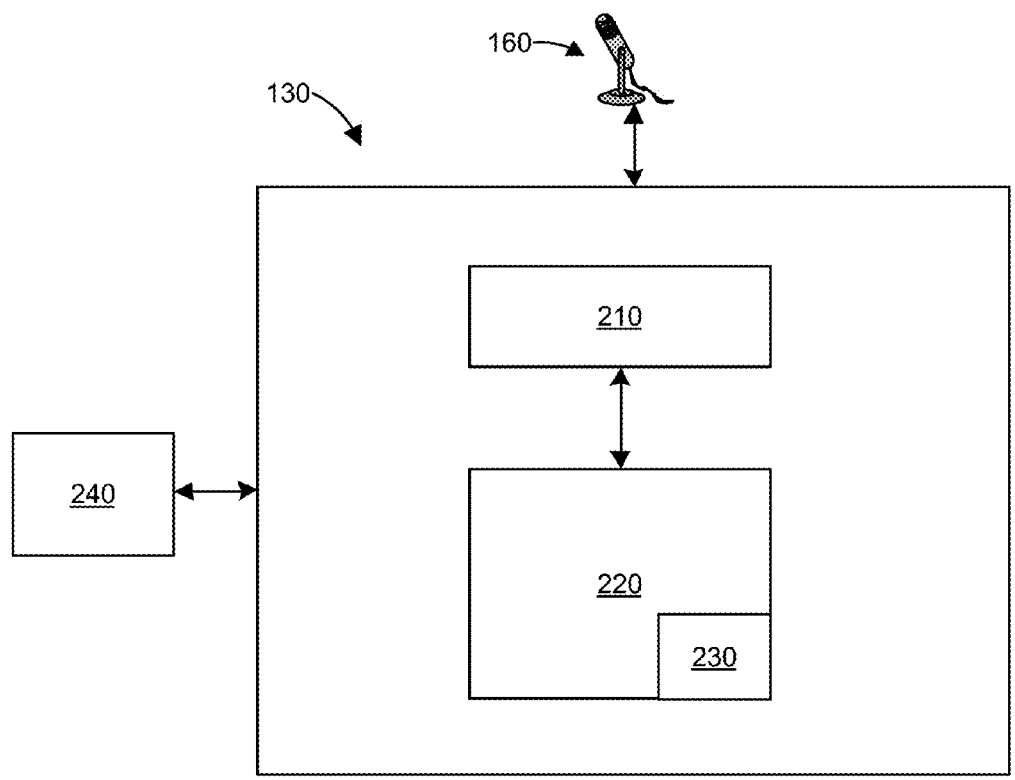
FIG. 2 illustrates a block diagram of a control unit of the coffee bean roaster in accordance with an embodiment of the present invention.

FIG. 2 illustrates the internal components of the control unit 130 (FIG. 1) in accordance with an embodiment of the present invention. Control unit 130 includes a processor 210 coupled to a memory 220 for storing program instructions, including program instructions for application 230 for roasting coffee beans utilizing one or more roasting acoustical characteristics of the coffee beans such as acoustic amplitude, frequency content, and rate of cracks. The method for roasting coffee beans utilizing the roasting acoustical characteristics of acoustic amplitude, frequency content and rate of cracks is discussed below in connection with FIG. 4.

Furthermore, as illustrated in FIG. 2, a microphone 160 (FIG. 1) and a display 240 are connected to the controller 130, where the display 240 can have touch screen capability for user input and system monitoring.

While the foregoing discusses the present invention in connection with utilizing a coffee bean roaster, the principles of the present invention may be implemented on a mobile device (mobile computing device may be any device, including, but not limited to, a mobile phone, a cellular phone, a smartphone, a personal digital assistant (PDA), a gaming unit, a portable computing unit, a tablet personal computer, and the like), where the user of the mobile device places the mobile device near the coffee bean roaster, such as coffee bean roaster 100 of FIG. 1, to receive the roasting acoustical characteristics via a microphone on the mobile device. A person of ordinary skill in the art would be capable of applying the principles of the present invention to such implementations. Further, embodiments applying the principles of the present invention to such implementations would fall within the scope of the present invention.

A description of one embodiment of the hardware configuration of such a mobile device is provided below in connection with FIG. 3.

Figure 3:
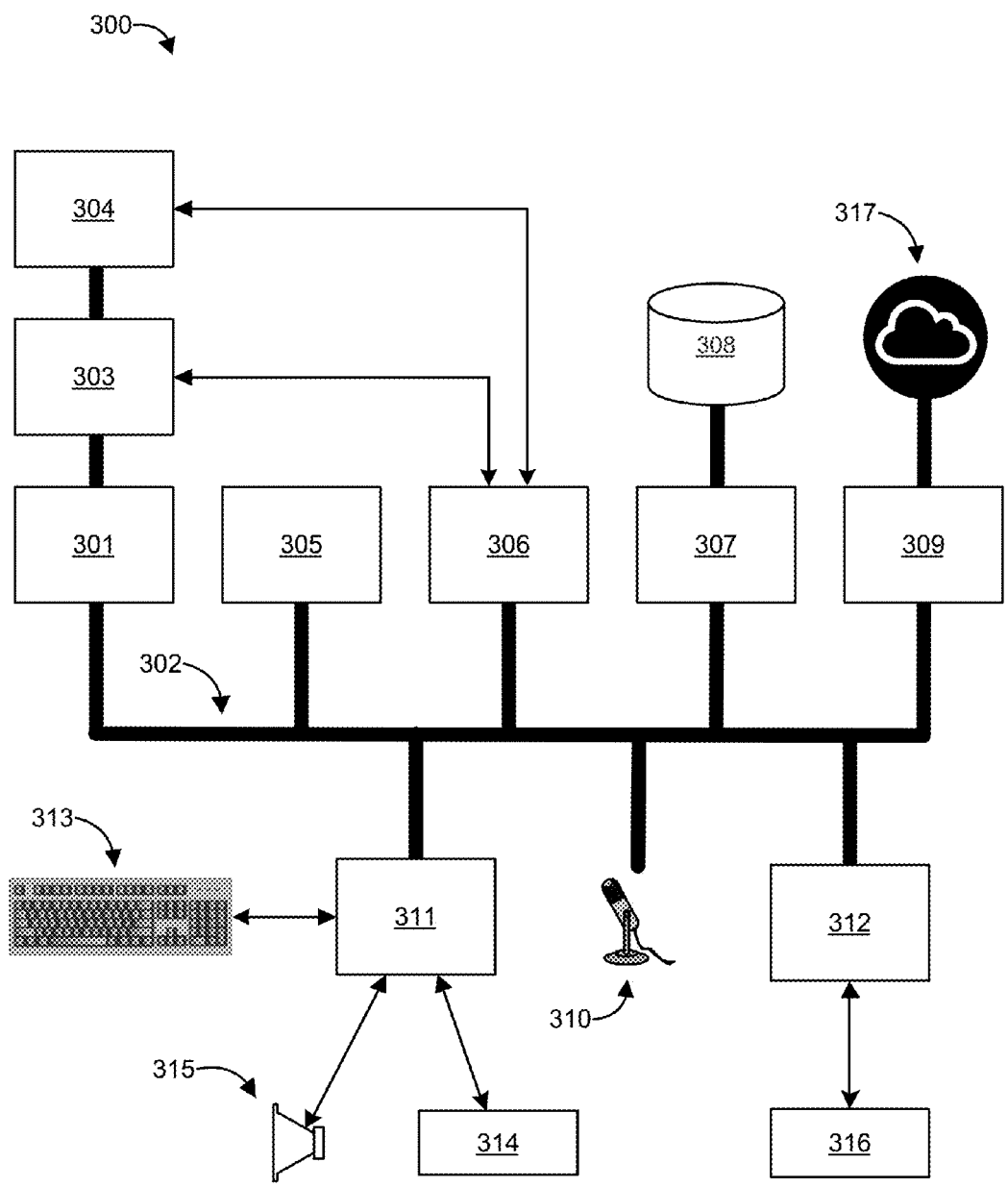
FIG. 3 illustrates a block diagram of a hardware configuration of a mobile device for practicing an aspect of the present invention.

FIG. 3 illustrates a hardware configuration of mobile device 300 which is representative of a hardware environment for practicing the present invention. Referring to FIG. 3, mobile device 300 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for roasting coffee beans utilizing the roasting acoustical characteristics of acoustic amplitude, frequency content and rate of cracks as discussed below.

Referring again to FIG. 3, read-only memory ("ROM") 305 is coupled to system bus 302 and includes a basic input/output system ("BIOS") that controls certain basic functions of mobile device 300. Random access memory ("RAM") 306 and disk adapter 307 are also coupled to system bus 302. It should be noted that software components including operating system 303 and application 304 can be loaded into RAM 306, which can be mobile device's 300 main memory for execution. Disk adapter 307 may be an integrated drive electronics ("IDE") adapter that communicates with a disk unit 308, e.g., a disk drive.

Mobile device 300 may further include a communications adapter 309 coupled to bus 302. Communications adapter 309 interconnects bus 302 with an outside network 317 thereby enabling mobile device 300 to communicate with other devices.

Mobile device 300 further includes a microphone 310 configured to detect the sounds emitted during the coffee roasting process. In one embodiment, microphone 310 is placed near roasting chamber 110 (FIG. 1) to detect the sounds emitting during the coffee roasting process. Such sounds will be measured and analyzed to better differentiate between the first and second cracks thereby better able to determine when to terminate the roasting process as discussed further below in connection with FIG. 4.

I/O devices may also be connected to mobile device 300 via a user interface adapter 311 and a display adapter 312. Keyboard 313, touchpad 314 and speaker 315 may all be interconnected to bus 302 through user interface adapter 311. A display monitor 316 may be connected to system bus 302 by display adapter 312. In this manner, a user is capable of inputting to mobile device 300 through keyboard 313 or touchpad 314 (or similar device, e.g., a mouse) and receiving output from mobile device 300 via display 316 or speaker 315. Other input mechanisms may be used to input data to mobile device 300 that are not shown in FIG. 3, such as display 316 having touch-screen capability and keyboard 313 being a virtual keyboard. Mobile device 300 of FIG. 3 is not to be limited in scope to the elements depicted in FIG. 3 and may include fewer or additional elements than depicted in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, the principles of the present invention provide a means for improving the detection of the first and second cracks by using roasting acoustical characteristics of acoustic amplitude, frequency content and rate of cracks thereby ensuring consistency in roasting the coffee beans and lowering energy costs by preventing the over roasting of the beans as discussed below in connection with FIG. 4.

Figure 4:
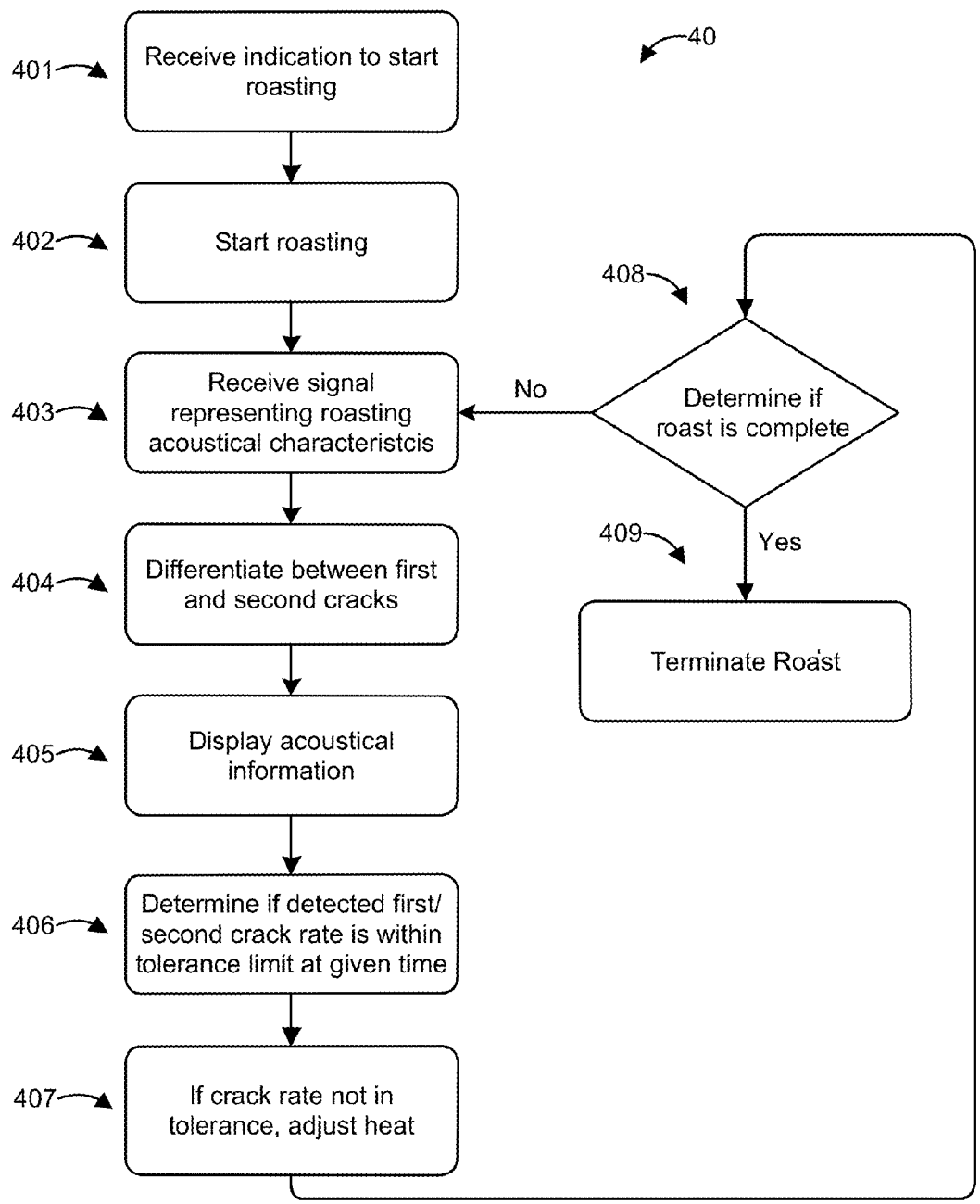
FIG. 4 is a flowchart of a method for roasting coffee beans utilizing the roasting acoustical characteristics of acoustic amplitude, frequency content and rate of cracks in accordance with an embodiment.

FIG. 4 is a flowchart 40 of a method for roasting coffee beans utilizing the roasting acoustical characteristics of acoustic amplitude, frequency content and/or rate of cracks in accordance with an embodiment.

While the following steps in the flowchart 40 are described in connection with the embodiment of utilizing coffee bean roaster 100 (FIG. 1), the flowchart 40 may be utilized by, or in combination with, mobile device 300, including elements 303-305.

Referring to FIG. 4, in conjunction with FIGS. 1-2, in step 401, control unit (e.g., controller 130) receives an indication to start the roasting process from the human operator, such as via a touch-screen display or other input device.

In step 402, control unit (e.g., controller 130) starts the roasting process of coffee beans, e.g., by sending a signal to a heater (e.g., heater 120).

In step 403, control unit receives signals output from a microphone (e.g., microphone 160) disposed in or near the roasting chamber (e.g., roasting chamber 110). The signals represent sounds detected by the microphone. The sounds can include acoustical properties of the roasting chamber such as acoustic amplitude, frequency content and rate of cracks. The signals can be digital and/or analog signals.

In step 404, the control unit first determines whether it detects a crack and, if a crack is detected, the control unit then differentiates between the "first" crack and "second" crack. Both the crack detecting and the crack differentiating can be based on at least one of (a) the acoustic amplitude of the cracks, (b) the frequency content of the cracks, and (c) the rate of cracks. As discussed above, the first crack is a cracking sound that is emitted by the coffee beans between about 200-220° C. and the second crack is a cracking sound that is emitted by the coffee beans between about 224-245° C.

Figure 5:
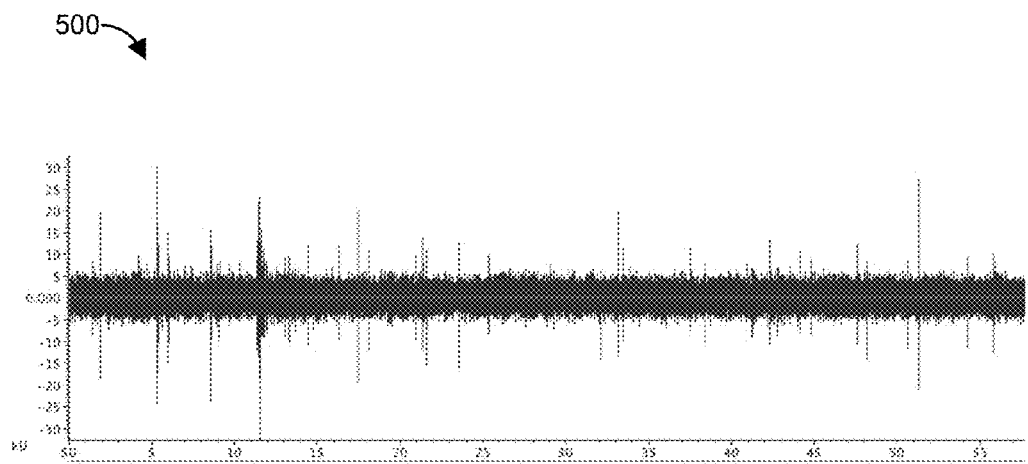
FIG. 5 is a graph of the acoustic pressure profile of a first crack chorus according to an embodiment.
Figure 6:
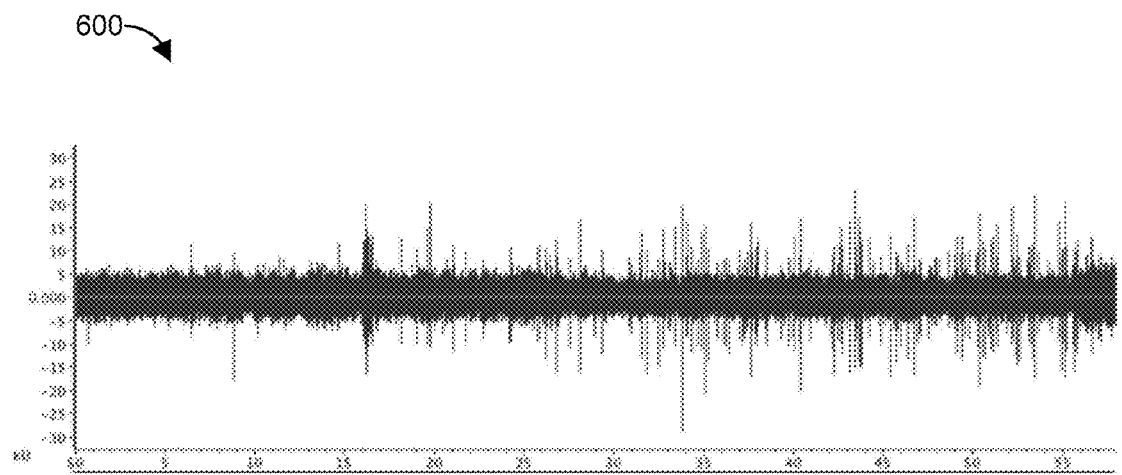
FIG. 6 is a graph of the acoustic pressure profile of a second crack chorus according to an embodiment.
Figure 7:
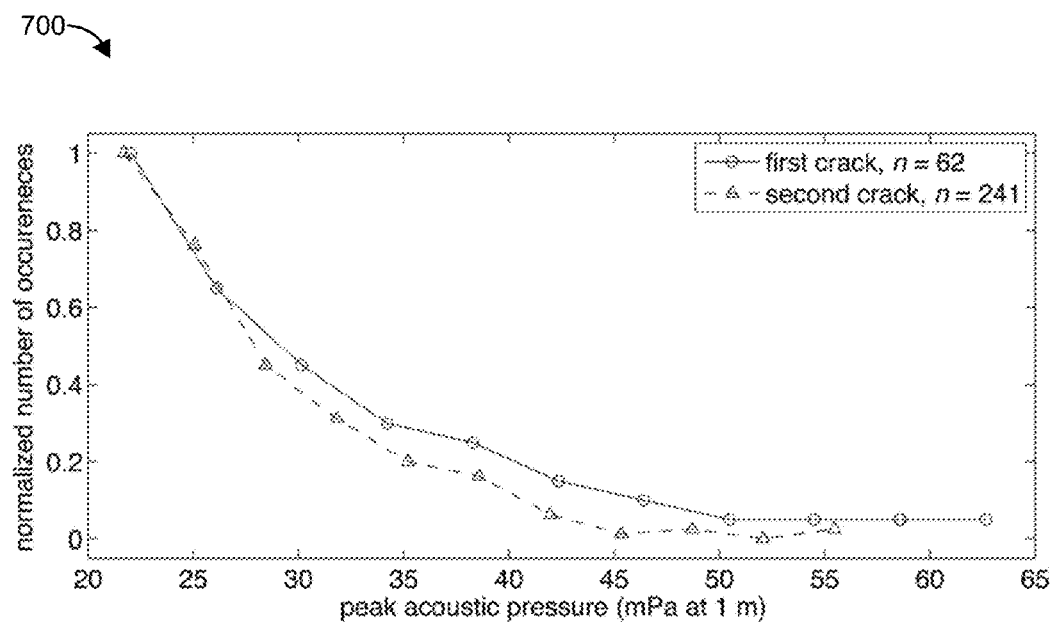
FIG. 7 is a graph illustrating the distribution of the peak acoustic pressure amplitudes recorded during first and second crack choruses in accordance with an embodiment of the present invention.

A previous analysis of the crackling events involved in the roasting of a 0.23 kg batch of green coffee beans through the end of the second crack using a consumer-grade, 0.45-kg-capacity, drum-based coffee roaster with an electrical heating element (1.6 kW) was conducted. The beans were a typical blend of *Arabica* and *Robusta* beans marketed as an espresso blend. In such an analysis, it was determined that the cracking events could be detected automatically using thresholding above +23 mPA and below −23 mPA. A graph 500 of the acoustic pressure profile of the first crack chorus is illustrated in FIG. 5. A graph 600 of the acoustic pressure profile of the second crack chorus is illustrated in FIG. 6. The analysis was conducted on all the cracks found above this amplitude threshold, which resulted in detection of 62 cracking events in the first crack chorus and 241 events in the second crack chorus. To quantify the qualitative assessment that the first crack is louder than the second crack, the peak acoustic pressure (scaled to 1 m by spherical spreading) of individual cracking events was analyzed and histograms were formed for the events of the first and second crack. These crack amplitude distributions are shown in FIG. 7, which is a graph 700 illustrating the distribution of the peak acoustic pressure amplitudes recorded during first and second crack choruses in accordance with an embodiment of the present invention. The number of occurrences was normalized by the maximum value for each case (20 and 80 for the first and second cracks, respectively). The total number of cracks, n, is listed in the legend of FIG. 7. The acoustic amplitudes were measured at 0.35 m range and scaled to 1 m assuming spherical spreading.

As illustrated in FIG. 7, it can be seen that the maximum amplitudes of the first and second crack are 63 mPa and 55 mPa, respectively, and that there are a larger number of higher amplitude events in the first crack. Hence, a "peak finding" procedure (instantaneous, average, windowed, etc.) can be used by control unit 130 to automatically differentiate between the first and second cracks using the peak acoustic pressure and/or the relative peak acoustic pressure.

Figure 8:
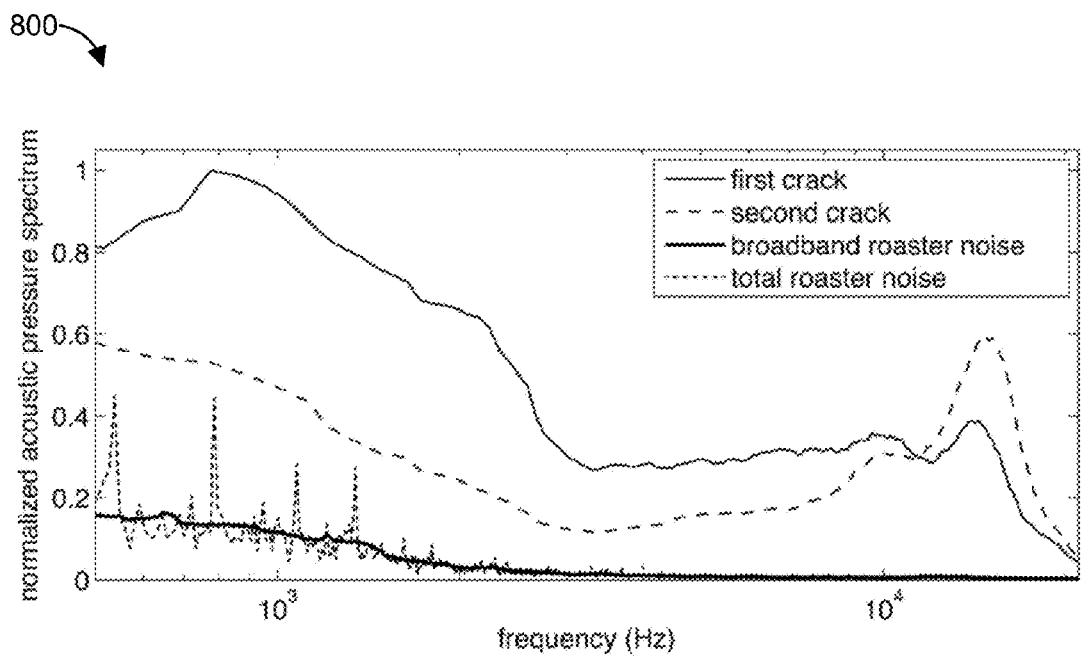
FIG. 8 is a graph illustrating the averaged acoustic pressure spectra for 10 individual crack events within the first and second crack choruses in accordance with an embodiment of the present invention.

In step 404, the control unit 130 can also differentiate between the "first" crack and the "second" crack based on the mean spectral content of the cracks utilizing the frequency of sound emitted from the roasting chamber. In the analysis discussed above, it was discovered that the first crack events are lower in frequency than the second crack events. In order to quantify such an assessment, the averaged acoustic pressure spectra were calculated. Ten individual cracks were taken at random from within both first and second crack choruses. These events included both the cracking sounds and the noise due to the roaster. The pressure signatures were detrended, then 512-point, Hann windowed fast Fourier transforms (FFTs) were applied and averaged. These averaged acoustic pressure spectra are shown in FIG. 8, which illustrates a graph 800 of the averaged acoustic pressure spectra for 10 individual crack events within the first and second crack choruses in accordance with an embodiment of the present invention. Roaster noise spectra (total and broadband only) are also shown in FIG. 8. All spectra were normalized by the maximum value of the first crack spectrum.

As illustrated in FIG. 8, the first crack contains more low frequency content, with a spectral peak at about 800 Hz. The second crack exhibits a flatter spectrum that is lower in amplitude than the first crack up through about 10 kHz, and has a spectral peak at about 15 kHz. The background noise emitted by the roaster, including the sounds of the beans rotating in the drum, and the sound of a fan circulating heated air, but absent of any cracking events was analyzed in the same way, except using 4096-point FFTs, to better resolve the tonal components of the roaster noise. Ten segments of crack-free noise were used to determine the average noise spectra due to all other aspects of the roasting process. FIG. 8 shows broadband noise due to beans rotating in the drum and the broadband component of fan noise, which can be seen along with spectral lines due to the rotating machinery. To further emphasize the mean characteristics of the broadband noise, a smoothed spectrum is also shown in the curve for the broadband noise. In all cases, the noise level is sufficiently below the level of the cracking events.

These results indicate that the mean spectral content of just ten individual cracks, including roasting process noise, can be used to automatically differentiate between first crack and second crack acoustically, using a relatively low-resolution FFT, even when no special care is taken to reduce or exclude the roasting process noise.

Figure 9:
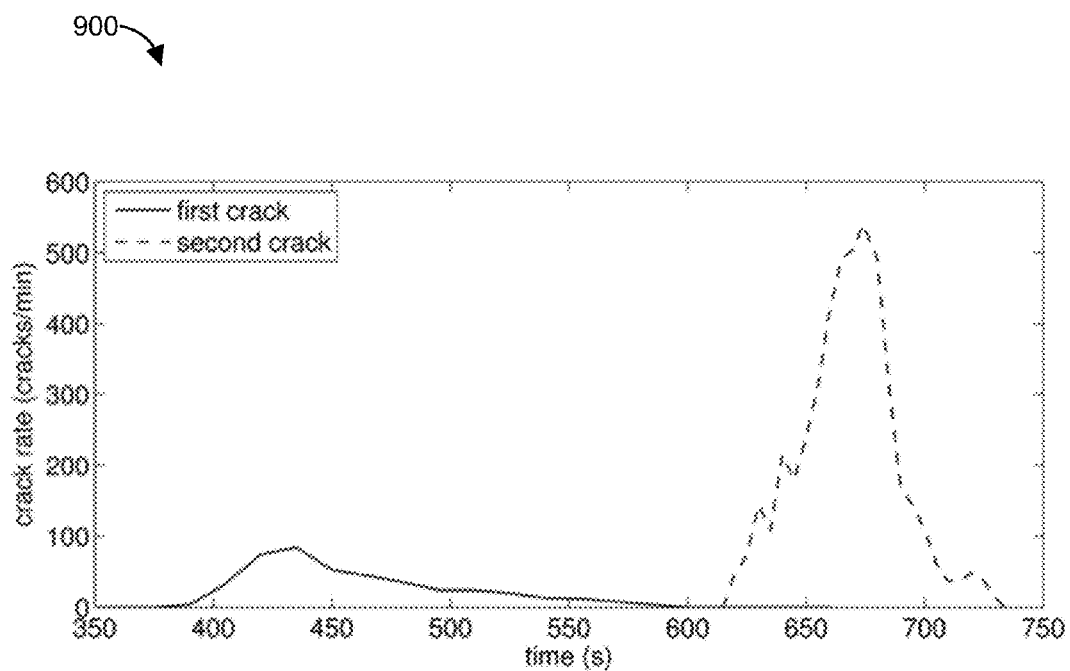
FIG. 9 is a graph illustrating the rate of individual cracking events for both the first crack and second crack as a function of time during the roast in accordance with an embodiment of the present invention.

In step 404, the control unit 130 can also differentiate between the "first" and "second" cracks based on the rate of emission of individual cracks. In the analysis discussed above, the rate of emission of individual cracks was analyzed for both first and second crack choruses as a function of roast time and is shown in FIG. 7. FIG. 9 is a graph 900 illustrating the rate of individual cracking events for both the first crack and second crack as a function of time during the roast in accordance with an embodiment of the present invention. Cracks were tallied within the time intervals of 15 s and 5 s for the first and second crack choruses, respectively.

As illustrated in FIG. 9, the first crack progresses from just before 400 s within the roast and ends at about 600 s. The second crack begins at about 620 s and ends at about 730 s. The qualitative assessment that second crack events occur more frequently than the first crack events is verified. FIG. 9 further shows that the first crack has a peak rate of about 100 cracks per minute, while the second crack has a peak rate of over 500 cracks per minute. These results also indicate that the cracking rate can be used to differentiate between the first and second cracks thereby providing a third metric for the automatic acoustic monitoring of the roast.

Some or all of the above techniques can be used to detect whether a crack is detected in addition to differentiating between first and second cracks.

In step 405, control unit 130 optionally displays the first and/or second crack rates that were detected using the roasting acoustical characteristics of acoustic amplitude, frequency content and/or rate of cracks per unit time. The control unit 130 can also display acoustical spectral information regarding the roasting process, for example in a form similar to one or more of FIGS. 5-9.

Figure 11:
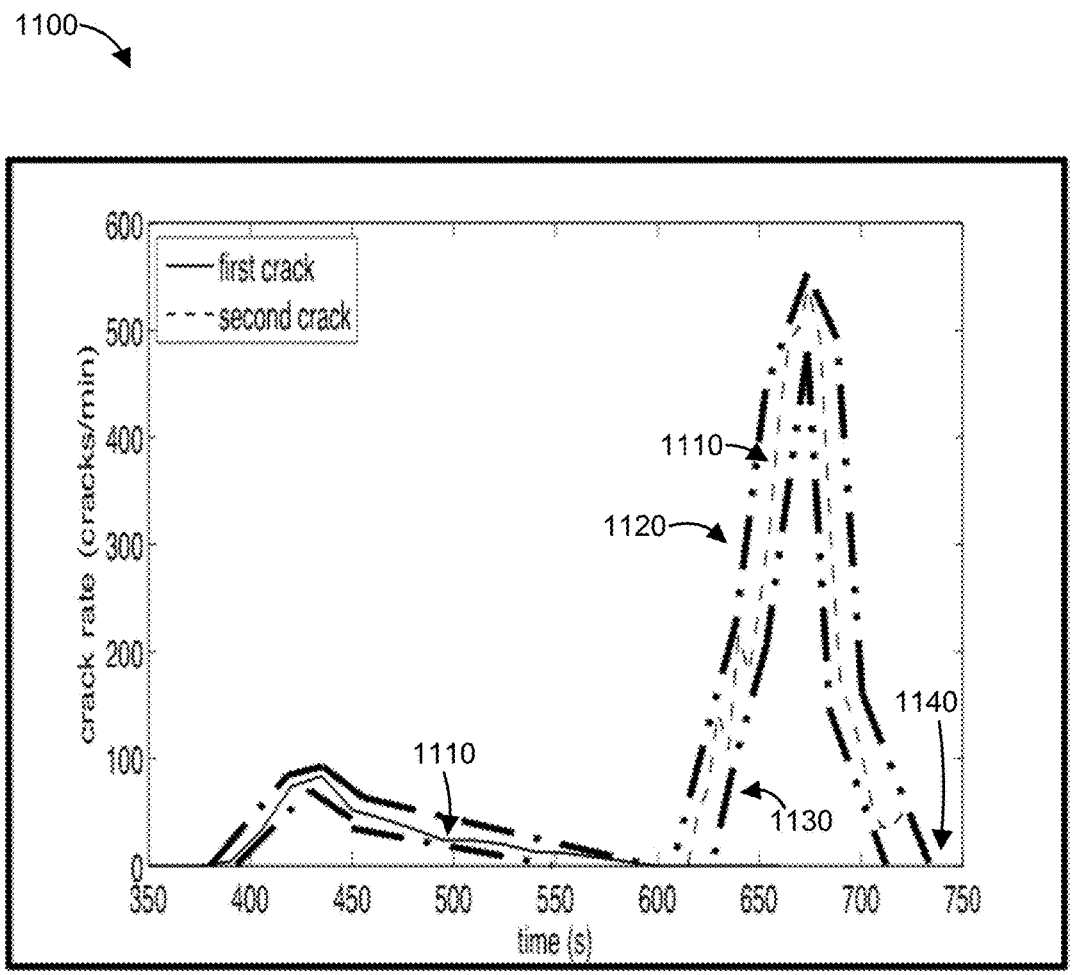
FIG. 11 is an example of a reference acoustical profile of crack rates.

Returning to FIG. 4, in conjunction with FIGS. 1-2, in step 406, a determination is made by control unit 130 as to whether the detected first crack rate is within a first tolerance at a given time and/or the detected second crack rate is within a second tolerance at a given time. The first and second crack rate tolerances can be calculated statistically, empirically, and/or arbitrarily, as further discussed below. The first and second crack rate tolerances can be calculated with respect to a reference crack rate profile, which includes reference crack rates at reference roasting times (e.g., based on modeling or experimentation). An example of a reference crack rate profile with tolerance limits is illustrated in FIG. 11. The first crack rate tolerance limit (e.g., percentage variance from reference crack rate profile) for the first crack rate can be the same or different than the second crack rate tolerance limit for the second crack rate.

If the detected crack rate is outside of the tolerance limit, in step 407, the control unit 130 sends a signal to the coffee roaster to adjust the heat to the roasting chamber 110. For example, if the detected crack rate is below the lower tolerance limit, the control unit 130 sends a signal to increase the heat to the roasting chamber 110. If the detected crack rate is above the upper tolerance limit, the control unit 130 sends a signal to the decrease the heat to the roasting chamber. The increase and/or decrease of heat can be achieved by adjusting the input to the heater 120 or other components of the roaster, as discussed below.

In step 408, the control unit 130 determines if the roast is complete. Such a determination can be made by comparing the measured crack rate profile with the reference profile. For example, the reference profile can indicate that a light roast occurs after the first cracks have begun and the measured first crack rate exceeds a first threshold value (e.g., 20 cracks/min.). The reference crack rate can be normalized/adjusted based on the weight of the coffee beans being roasted. In another example, the reference profile can indicate that a medium roast occurs after the first cracks have begun and the measured first crack rate has reached a maximum value and/or the rate of change of the measured first crack rate is zero (i.e., the time derivative of the measured crack rate is zero). The roast time at which the maximum of the reference first crack occurs in the reference profile (e.g., 435 seconds in FIG. 9) can be normalized/adjusted based on the weight of the coffee beans being roasted. In another example, the reference profile can indicate that an espresso roast occurs after (a) the first crack has begun; (b) the first crack has ended; (c) the second crack has begun; and (d) the second crack rate exceeds a second threshold value (e.g., 10 cracks/min.). In another example, the reference profile can indicate that a dark roast occurs after (a) the first crack has begun; (b) the first crack has ended; (c) the second crack has begun; and (d) the second crack rate exceeds a third threshold value (e.g., 300 cracks/min.) or a maximum value. As noted above, the threshold values can be normalized/adjusted based on the weight of the coffee beans being roasted. Other examples will be apparent to those skilled in the art.

If the roast is not complete, as determined in step 408, then control unit 130 continues to receive roasting acoustical characteristics of acoustic amplitude, frequency content and rate of cracks from microphone(s) 160 by returning to step 403. If the roast is complete, then control unit 103 stops the roasting process at step 409.

In this manner, consistency in the roasting process can be ensured while also lowering energy costs by preventing the over roasting of the coffee beans. In some embodiments, the controls described above with reference to FIG. 4 can be combined with the controls described below with reference to FIG. 12.

Figure 10:
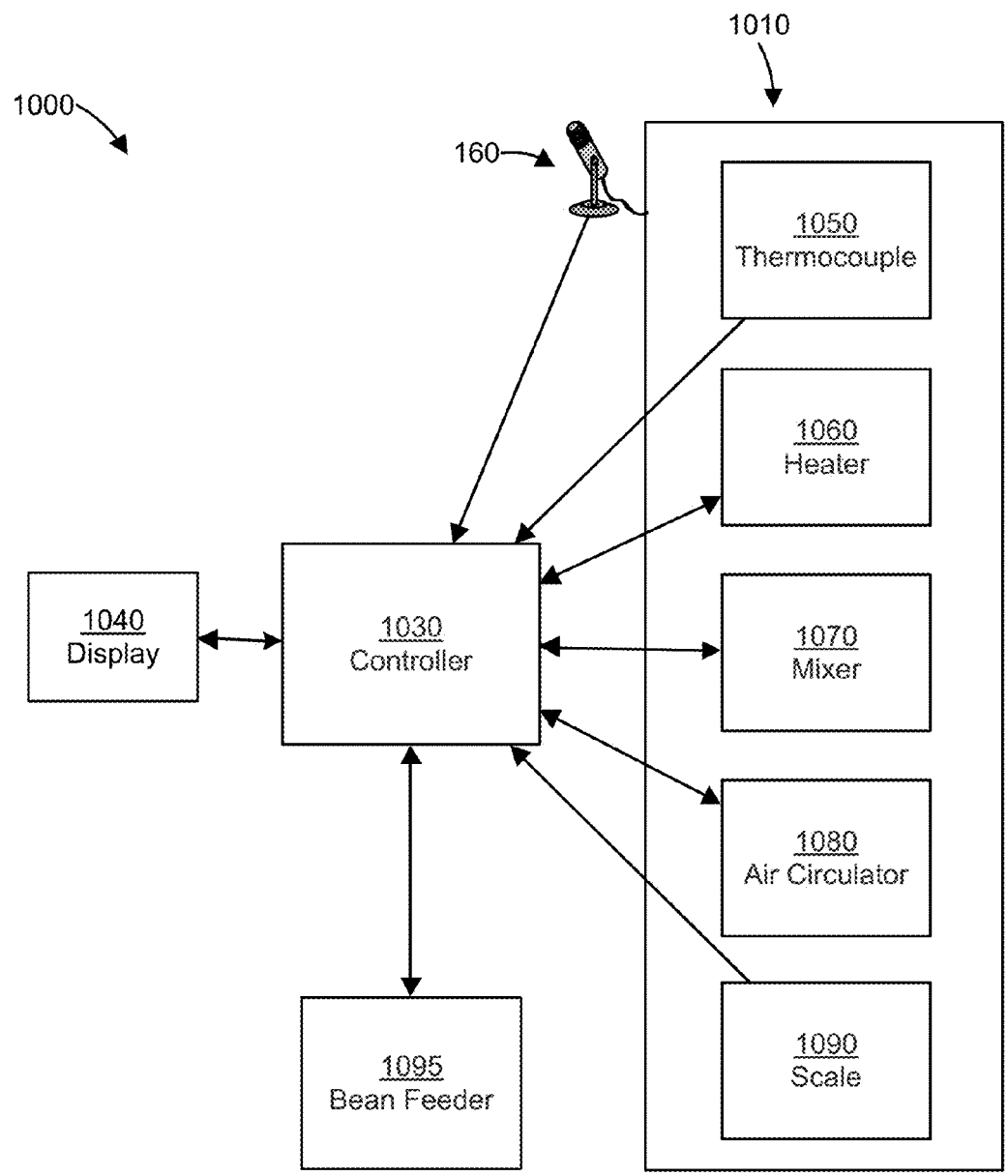
FIG. 10 is a block diagram of a system for controlling a coffee roaster.

FIG. 10 is a block diagram of a system 1000 for controlling a coffee roaster 1010. The coffee roaster 1010 includes various components and modules including one or more thermocouples 1050, a heating unit 1060, a mixer 1070, an air circulator 1080, and a bean scale 1090. The thermocouples 1050 can be disposed in the roasting chamber, at the air inlet and/or outlet of the roasting chamber (e.g., to detect the temperature of hot air generated by the heating unit 1060), and in or near the heating unit 1060. The mixer 1070 is in mechanical communication with the roasting chamber to mix or stir the coffee beans during roasting. The air circulator 1080 can be a fan, a vacuum, or a pump to promote the circulation of air from the heater 1060 into and out of the roasting chamber. The scale 1090 is disposed at the bottom of the roasting chamber to measure the weight of coffee beans being roasted.

The controller 1030 receives as inputs a signal representing the temperature(s) measured by the thermocouple(s) 1050 in real-time, a signal representing the real-time performance of the heater 1060 (e.g., electrical current usage, internal thermocouple output, etc.), a signal representing the real-time performance of the mixer 1070 (e.g., mixing rate, rotation rate), a signal representing the real-time performance of the air circulator (e.g., fan speed, pressure), and a signal representing the weight of the coffee beans as measured by the scale 1090. The signal from the scale 1090 can be received by the controller 1030 before coffee roasting begins and/or in real time during the roasting process.

In addition, the controller 1030 receives as an input a signal representing the real-time acoustical energy measured by the microphone 160. As discussed above, the microphone 160 can be located in or near the roasting chamber including outside of the coffee roaster 1010 (provided that the microphone 160 is sensitive enough to detect the acoustical energy of the roasting chamber, as discussed above). The controller 1030 can also be in communication with a bean feeder 1095 for continuous-feed coffee roasters. The controller 1030 can receive as an input a signal representing the real-time performance of the bean feeder 1095 (e.g., feed rate, size of aperture in gravity feeder that allows coffee beans to fall into the roasting chamber, conveyor belt speed, etc.).

The controller 1030 can determine whether the real-time acoustical energy of the roasting process (as measured by the microphone 160) conforms to a reference acoustical roasting profile. An example of a reference acoustical profile 1110 with upper control limits 1120 and lower control limits 1130 is illustrated in graph 1100 in FIG. 11. The upper and lower control limits 1120, 1130 can be determined statistically (e.g., based on six sigma or the like), empirically, or based on a pre-determined percentage variance (e.g., 5% or 10%) of the reference acoustical profile 1110. The reference acoustical profile 1110 can represent the target crack rates over time as coffee beans are roasted to a particular roast level (e.g., French roast). Since the crack rate is a function of the temperature of the coffee beans, the crack rate can be used to control the heater 1060 and/or the air circulator 1080. For example, if the measured crack rate (e.g., instantaneous measured crack rate) is greater than the upper control limit 1120 of the reference acoustical profile 1110, the controller 1030 can send a control signal to reduce the current and/or increase the fan speed, respectively, of the heater 1060 and the air circulator 1080. In addition, when the measured crack rate (e.g., instantaneous measured crack rate) follows the reference acoustical profile 1110 to the end 1140 (or any point that corresponds to a desired roast), the controller 1030 can send a signal to terminate the roasting process. By controlling the measured crack rate to the reference acoustical profile 1110, the coffee roasting process can be more consistent from batch to batch. Also, the control can prevent over roasting, which can reduce waste and unnecessary energy consumption as well as enhance taste (e.g., an over roasted bean can be bitter).

In some embodiments, the reference acoustical profile includes the measured acoustical pressure, the measured peak acoustical pressure, a Fourier transform and/or fast Fourier transform (FFT) of the measured acoustical pressure. For example, the graphs 700 and 800 of FIGS. 7 and 8, respectively, can be used as reference acoustical profiles. For example, the controller 1030 can compare the actual measured peak acoustical pressure during roasting (e.g., graphs 500 and 600) with a reference peak acoustical pressure profile (e.g., graph 700) to determine whether the roast is in the first crack chorus or the second crack chorus. Similarly, the controller 1030 can compare the FFT of the measured acoustical pressure to determine if the frequency spectrum of the measured acoustical pressure approximately matches a reference frequency spectrum of a first crack chorus or a second crack chorus (e.g., first crack and second crack lines in graph 800) to determine whether the roast is in the first crack chorus or the second crack chorus. In some embodiments, some or all of the reference acoustical profiles discussed above can be used by the controller 1030. One skilled in the art will recognize that other reference acoustical profiles can be used.

The controller 1030 is in communication with a display 1040. The display 1040 can provide visual feedback to the operator regarding the status of the roasting process. For example, the display 1040 can display the roaster temperature measured by thermocouple 1050, the real-time performance of the heater 1060 (e.g., electrical current usage, internal thermocouple output, etc.), a the real-time performance of the mixer 1070 (e.g., mixing rate, rotation rate), a the real-time performance of the air circulator (e.g., fan speed, pressure), and/or the weight of the coffee beans as measured by the scale 1090. In addition or in the alternative, the display 1040 can provide an indication that the roasting process is within the process limits. For example, the display 1040 can provide a first indication (e.g., a green circle) that the temperature measured by the thermocouple 1050 is within a first tolerance (e.g., 5%) of the target temperature, a second indication (e.g., a yellow circle) that the temperature measured by the thermocouple 1050 is between a first tolerance and a second tolerance (e.g., 5-10%), and a third indication (e.g., a red circle) that the temperature measured by the thermocouple 1050 is above the second tolerance (e.g., greater than 10%). Similar indications can be displayed for the heater 1060, the mixer 1070, and other components of the roaster.

In some embodiments, the display 1040 can display a graph of a reference acoustical profile versus the measured acoustical profile of the roast. In addition or in the alternative, the display 1040 can provide an indication that the roasting process is within the process limits. For example, the display 1040 can provide a first indication (e.g., a green circle) that the measured crack rate is within a first tolerance (e.g., 5%) of the reference crack rate, a second indication (e.g., a yellow circle) that the measured crack rate is between a first tolerance and a second tolerance (e.g., between 5 and 10%) of the reference crack rate, and a third indication (e.g., a red circle) that the measured crack rate is above the second tolerance (e.g., above 10%) of the reference crack rate. Similar indications can be displayed for the actual measured peak acoustical pressure vs. reference peak acoustical pressure and the FFT of the actual measured acoustical pressure.

Figure 12:
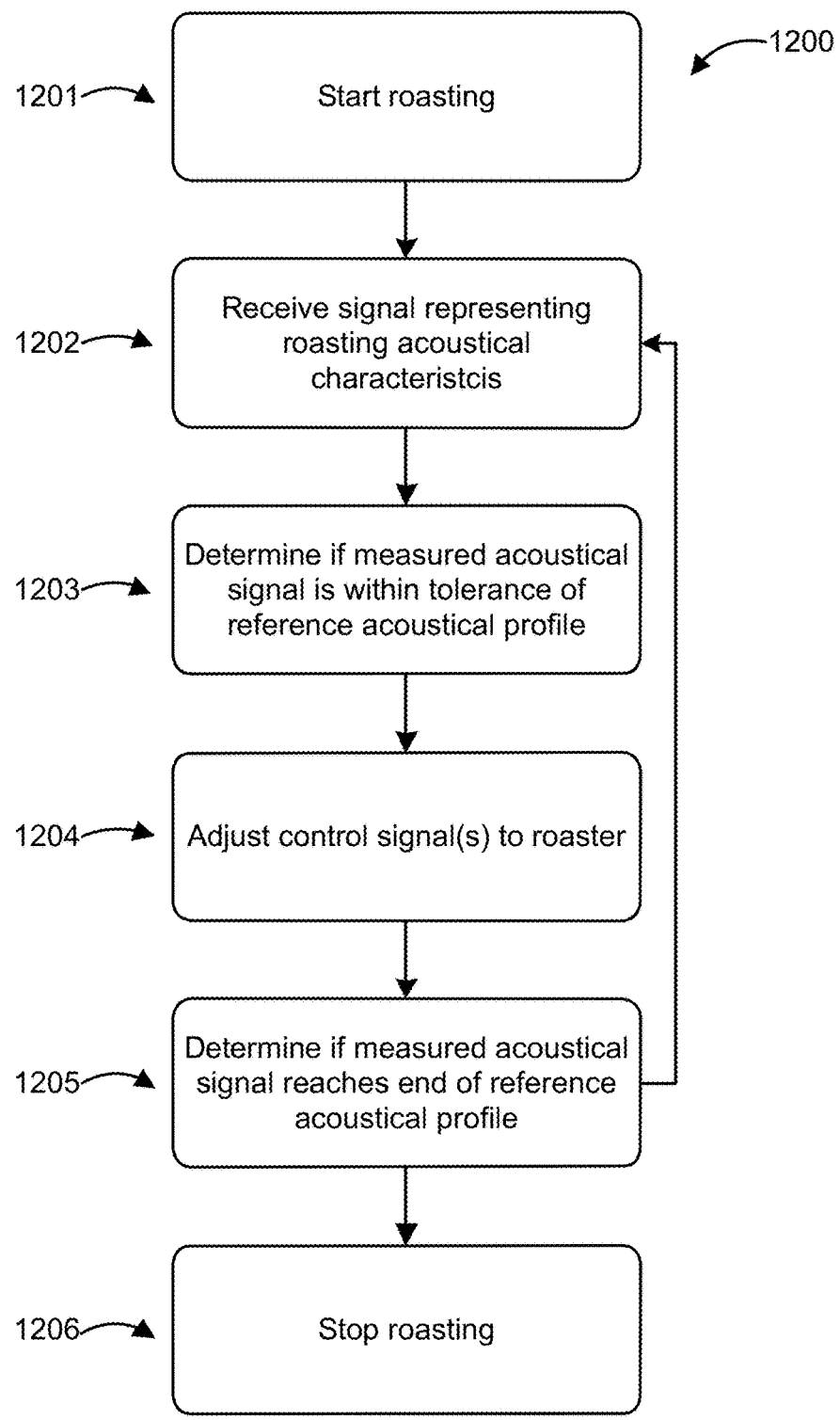
FIG. 12 is a flowchart of a method for controlling a coffee roaster and for controlling the coffee roasting process.

FIG. 12 is a flowchart 1200 of a method for controlling a coffee roaster and for controlling the coffee roasting process. In step 1201, the coffee roasting process begins by the user selecting the desired roasting level (e.g., medium roast, dark roast, etc.). The selection can occur through a display screen (e.g., a touch screen), a button on the coffee roaster, or similar user interface. Once this selection is made, the controller sends a signal to the heater to heat the roasting chamber to a target temperature (e.g., 250° C.). The controller also sends a control signal to the air circulator and the mixer to begin operation. The air circulator and the mixer can have an initial set point, which can be based on the selected roasting level.

In step 1202, the controller receives a signal representing the acoustical characteristics of the roasting chamber. The acoustical characteristics can include acoustic pressure and frequency, as discussed above. In step 1203, the controller compares the measured acoustical signal with a reference acoustical profile, which can be based on the selected roasting level, to determine if the measured acoustical signal is within a tolerance (e.g., 5%) of the reference acoustical profile, as discussed above. In step 1204, the controller adjusts the control signal to the roaster (e.g., to the heater, the air circulator, and/or the mixer) if the measured acoustical signal is not within tolerance, for example to raise or lower the heat in the roasting chamber. The controller can use various control algorithms such as PID, PI, PD, or P control algorithms as known in the art. In step 1205, the controller determines whether the measured acoustical signal (e.g., crack rate) has reached the end of the reference acoustical profile, for example as discussed with respect to FIG. 11. If the end of the reference acoustical profile has not been reached, the flow chart returns to step 1202 to continue to control the roaster using the acoustical characteristics of the roasting chamber. When the controller determines that the measured acoustical signal has reached the end of the reference acoustical profile, the controller stops the roasting process at step 1206.

In some embodiments, the controls described above with reference to FIG. 12 can be combined with the controls described above with reference to FIG. 4.

In some embodiments, the methods and systems described above can be applied to differentiating between different types of coffee beans. For example, the methods and systems can be applied to differentiating between decaffeinated coffee beans and regular (caffeinated) coffee beans, which have different densities. In general, decaffeinated coffee beans have a lower density than regular coffee beans. Due to this relative difference in density, the coffee beans have a corresponding difference in acoustical properties (e.g., amplitude and/or frequency). For example, the low density decaffeinated beans can produce a higher frequency sound than the high density regular/caffeinated beans. Therefore, the sounds made by the beans as they are stirred in the roasting chamber (e.g., in a rotating drum) differ based on whether the beans are caffeinated or decaffeinated. In addition, the sounds of the first crack and/or the second crack differ between beans that are caffeinated and beans that are decaffeinated. For example, decaffeinated beans can have a higher frequency first crack compared to regular beans. Such sounds and acoustical properties can be detected with a microphone disposed in or near the roasting chamber, as discussed above.

In addition, the sounds made the roasted beans during the drying process (in which the beans are stirred on a metal plate) can have different acoustical properties based on whether the beans are decaffeinated or regular (caffeinated). Such sounds and acoustical properties can be detected with a microphone disposed in or near the drying chamber.

A controller can compare the detected sounds (using signals from the microphone) to reference acoustical profiles for caffeinated and decaffeinated beans to determine or confirm that the roasting beans are caffeinated or decaffeinated. For example, if the detected sounds and acoustical profile are within a first tolerance of a reference acoustical profile for decaffeinated coffee beans, the controller can determine that the roasting coffee beans are decaffeinated. Similarly, if the detected sounds and acoustical profile are within a second tolerance of a reference acoustical profile for caffeinated coffee beans, the controller can determine that the roasting coffee beans are caffeinated. The controller can also determine certain physical properties of the coffee beans based on the detected sounds, such as the relative water content and average bean size, for example by comparing the measured acoustical properties with one or more additional reference acoustical profiles. The controller can provide an output that can be graphically displayed on a display screen to indicate whether the coffee beans are caffeinated or decaffeinated. The output can also include some or all of the detected physical properties of the beans.

Figure 13:
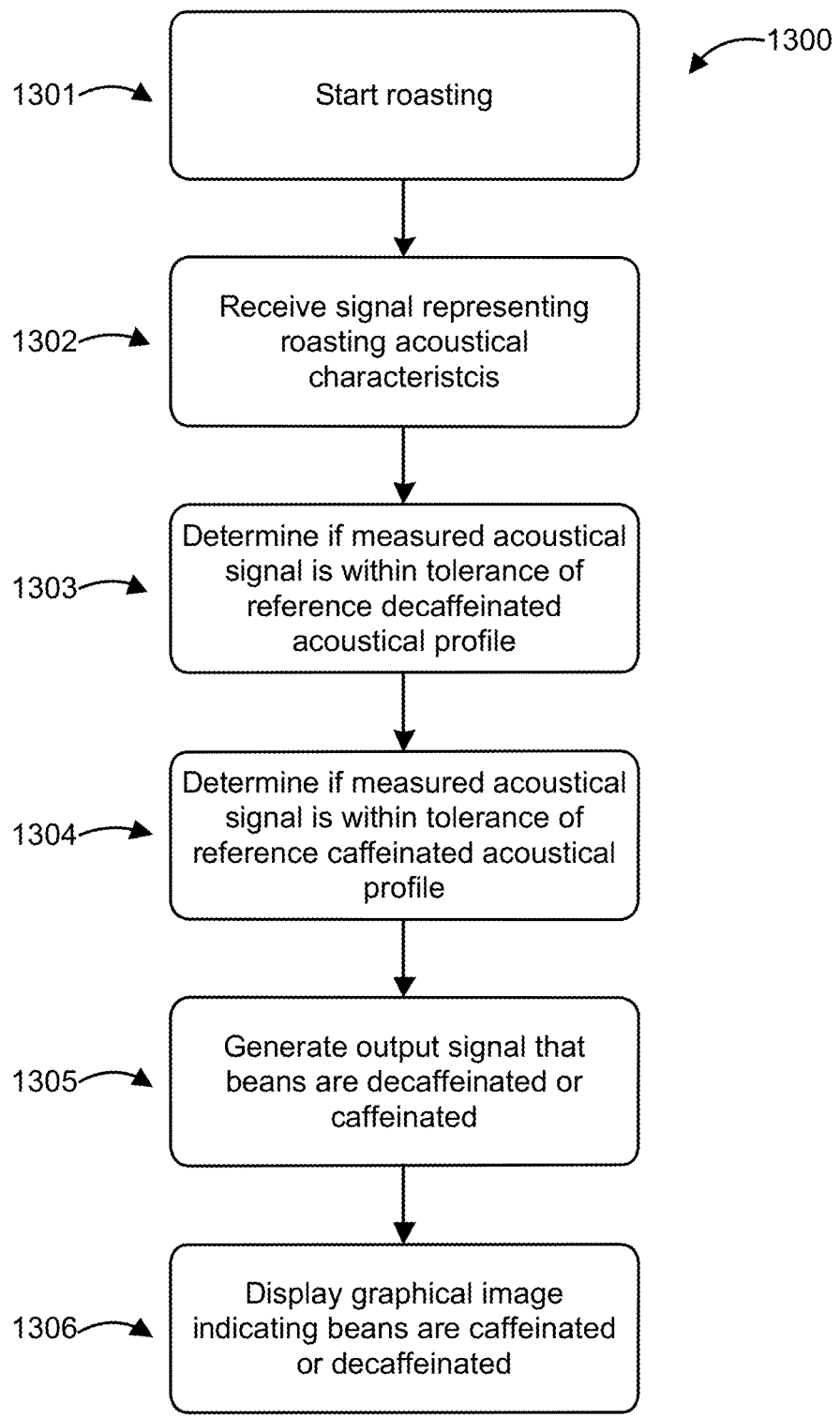
FIG. 13 is a flowchart of a method for measuring a physical property of coffee beans during roasting.

FIG. 13 is a flowchart 1300 of a method for measuring a physical property of coffee beans during roasting. After roasting begins (step 1300), a microphone detects the sounds generated in the roasting chamber. The sounds include the beans being stirred (e.g., in a drum) and the beans undergoing the first and second cracks. The microphone outputs a detected signal representing the detected sound, which is provided to a controller (step 1301). In step 1302, the controller compares the detected signal, which includes the acoustical properties of the detected sound, with a reference decaffeinated acoustical profile of reference decaffeinated coffee beans in a reference roasting chamber. The controller determines whether the acoustical profiles match or are within a first tolerance (e.g., 5%) of one another. In step 1302, the controller compares the detected signal with a reference caffeinated acoustical profile of reference caffeinated coffee beans in a reference roasting chamber. The controller determines whether the acoustical profiles match or are within a second tolerance (e.g., 5%) of one another. In step 1303, the controller generates an output signal that indicates whether the roasting coffee beans are caffeinated or decaffeinated. The output signal is transmitted to a display, which displays an image that indicates that the beans are caffeinated or decaffeinated (step 1304).

As would now be appreciated, the above systems and methods allow for the dynamic control of coffee roasting through acoustical signals generated during the roasting process. Such systems and methods can reduce undesired over-roasting and/or inconsistent roasting of coffee beans, which wastes energy and causes an undesired flavor profile in the beans and resultant coffee beverage.

The present invention should not be considered limited to the particular embodiments described above, but rather should be understood to cover all aspects of the invention as fairly set out in the present claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. A method for controlling coffee roasting, the method comprising:

heating coffee beans in a coffee roasting chamber of a coffee roaster;

using a microphone, detecting a measured acoustic energy based on acoustic pressure emissions emitted from the coffee roasting chamber;

using a thermal sensor, detecting a measured temperature of the coffee roasting chamber;

in a real-time microprocessor-based controller, receiving as an input a first signal representing the measured acoustic energy;

in the controller, receiving as an input a second signal representing the measured temperature;

in the controller, at intervals during a period in which the coffee beans are in the coffee roasting chamber, determining if the measured acoustic energy is within a tolerance of a reference acoustical profile, the reference acoustical profile including reference acoustical characteristics of a reference coffee roasting process, the reference acoustical pressure profile comprising upper limits and lower limits;

in the controller, at such intervals, generating a control signal when the measured acoustic energy is outside the tolerance of the reference acoustical pressure profile;

at such intervals, transmitting the control signal from the controller to the coffee roaster, the control signal to increase a temperature of the coffee roasting chamber when the measured acoustic energy corresponds to the lower limit of the reference acoustical pressure profile, the control signal to decrease a temperature of the coffee roasting chamber when the measured acoustic energy corresponds to the upper limit of the reference acoustical pressure profile; and determining if the measured acoustic energy is generated from a first crack chorus of the coffee beans by comparing a measured acoustical pressure with a reference acoustical pressure profile from the reference acoustical profile.

2. The method of claim 1, further comprising adjusting an input to a heater using the control signal, the heater to provide thermal energy to the coffee roasting chamber.

3. The method of claim 1, further comprising adjusting an input to an air circulator using the control signal, the air circulator to circulate air in the coffee roasting chamber.

4. The method of claim 1, wherein the control signal is generated if a measured crack rate is outside a tolerance of a reference crack rate.

5. The method of claim 1, further comprising determining if the measured acoustic energy is generated from a first crack chorus of the coffee beans by comparing a measured crack rate with a reference crack rate profile from the reference acoustical profile.

6. The method of claim 1, further comprising determining if the measured acoustic energy is generated from a second crack chorus of the coffee beans by comparing a measured crack rate with a reference crack rate profile from the reference acoustical profile.

7. The method of claim 1, further comprising determining if the measured acoustic energy is generated from a second crack chorus of the coffee beans by comparing a measured acoustical pressure with a reference acoustical pressure profile from the reference acoustical profile.

8. The method of claim 1, further comprising displaying a first visual indication that the measured acoustic energy is within a first tolerance of the reference acoustical profile.

9. The method of claim 8, further comprising displaying a second visual indication that the measured acoustic energy is between the first tolerance and a second tolerance of the reference acoustical profile.

10. The method of claim 9, further comprising displaying a third visual indication that the measured acoustic energy is outside the second tolerance of the reference acoustical profile.

11. The method of claim 1, further comprising automatically terminating the coffee roasting based on the measured acoustic energy.

12. The method of claim 11, wherein the automatic termination occurs when the measured acoustic energy reaches an end of the reference acoustic profile.

13. The method of claim 1, wherein the reference coffee roasting process is for roasting decaffeinated coffee beans.

14. The method of claim 1, further comprising determining if the measured acoustic energy is generated from a first crack chorus of the coffee beans by comparing a measured mean spectral content with a reference mean spectral content profile from the reference acoustical profile.

15. The method of claim 1, further comprising determining if the measured acoustic energy is generated from a second crack chorus of the coffee beans by comparing a measured mean spectral content with a reference mean spectral content profile from the reference acoustical profile.

16. A system for controlling a roasting process for roasting coffee beans in a coffee roaster, comprising:
a chamber for holding coffee beans to be roasted;
a heat source in thermal communication with said chamber for heating said coffee beans to be roasted;
an acoustic sensor in acoustic communication with said coffee beans so that said acoustic sensor can sense acoustic pressure emissions from said coffee beans during their roasting;
a programmable processor receiving an output of said acoustic sensor;
said processor programmed and configured to determine at least amplitude information and frequency information from the output of said acoustic sensor;
said processor further programmed and configured to compare, at intervals during a period in which the roasting process takes place, said amplitude and said frequency information with pre-stored data, and further configured to compare a measured acoustic pressure profile to a reference acoustic pressure profile, so as to determine a bean roasting condition;
said processor further programmed and adapted to control said roasting process, including by adjusting upward and downward a temperature in said chamber, based at least on said bean roasting condition; and
a user interface coupled to a roasting controller providing an output of said user interface indicative of said bean roasting condition.

17. The system of claim 16, said programmable processor comprising a frequency domain processing circuit and programming instructions to determine frequency domain (spectral) content from the output of said acoustic sensor.

18. The system of claim 16, said acoustic sensor comprising at least one high-temperature microphone capable of withstanding environmental temperatures in excess of 200 degrees Fahrenheit and being responsive to acoustic input frequencies spanning at least a range of 100 Hz to 10 kHz.

19. The system of claim 16, wherein said bean roasting condition includes a first crack rate or a second crack rate.

20. A method for determining a physical property of coffee beans, the method comprising:
heating said coffee beans in a coffee roasting chamber of a coffee roaster;
using a microphone, detecting a measured acoustic energy emitted from the coffee roasting chamber;
in a real-time microprocessor-based controller, receiving as an input a first signal representing the measured acoustic energy;
in the controller, determining if the measured acoustic energy is within a first tolerance of a reference decaffeinated coffee bean roasting acoustical profile, the reference decaffeinated coffee bean roasting acoustical profile including reference decaffeinated acoustical characteristics of reference decaffeinated coffee beans in a first reference roasting process;
in the controller, determining if the measured acoustic energy is within a second tolerance of a reference caffeinated coffee bean roasting acoustical profile, the reference caffeinated coffee bean roasting acoustical profile including reference caffeinated acoustical characteristics of reference caffeinated coffee beans in a second reference roasting process;
in the controller, generating a first output signal that indicates that the coffee beans are decaffeinated if the measured acoustic energy is within the first tolerance of the reference decaffeinated coffee bean roasting acoustical profile;

in the controller, generating a second output signal that indicates that the coffee beans are caffeinated if the measured acoustic energy is within the second tolerance of the reference caffeinated coffee bean roasting acoustical profile; and presenting a graphical image on a display corresponding to the first output signal or the second output signal, the graphical image indicating the coffee beans are decaffeinated or caffeinated, respectively.

21. The method of claim 20, further comprising:

in the controller, determining at least one of a relative water content or average bean size based on the measured acoustic energy; and presenting a second graphical image on the display that indicates the relative water content or the average bean size.

* * * * *